US010325202B2

(12) United States Patent
Towal

(10) Patent No.: US 10,325,202 B2
(45) Date of Patent: Jun. 18, 2019

(54) INCORPORATING TOP-DOWN INFORMATION IN DEEP NEURAL NETWORKS VIA THE BIAS TERM

(71) Applicant: QUALCOMM Incorporated, San Diego, CA (US)

(72) Inventor: Regan Blythe Towal, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 839 days.

(21) Appl. No.: 14/848,288

(22) Filed: Sep. 8, 2015

(65) Prior Publication Data

US 2016/0321542 A1 Nov. 3, 2016

Related U.S. Application Data

(60) Provisional application No. 62/154,097, filed on Apr. 28, 2015.

(51) Int. Cl.
*G06F 15/18* (2006.01)
*G06N 3/08* (2006.01)
*G06N 3/04* (2006.01)
*G06N 7/00* (2006.01)

(52) U.S. Cl.
CPC .......... *G06N 3/088* (2013.01); *G06N 3/0481* (2013.01); *G06N 7/005* (2013.01)

(58) Field of Classification Search
CPC ....... G06N 3/088; G06N 3/0481; G06N 7/005

USPC .................................................... 706/15, 45
See application file for complete search history.

(56) References Cited

U.S. PATENT DOCUMENTS

| | | | |
|---|---|---|---|
| 8,239,336 B2 | 8/2012 | Le Roux et al. | |
| 8,386,401 B2 | 2/2013 | Virkar et al. | |
| 8,854,248 B2 | 10/2014 | Paglieroni et al. | |
| 2013/0036078 A9 | 2/2013 | Wilber | |
| 2015/0019468 A1 | 1/2015 | Nugent et al. | |

OTHER PUBLICATIONS

Zheng, Yin, Yu-Jin Zhang, and Hugo Larochelle. "Topic modeling of multimodal data: an autoregressive approach." In Proceedings of the IEEE Conference on Computer Vision and Pattern Recognition, pp. 1370-1377. 2014.*
Di Paolo E., "Evolving Robust Robots Using Homeostatic Oscillators", Cognitive Science Research Paper, No. 548 Mar. 2002 (Mar. 2002), XP055277515, Retrieved from the Internet: URL:http://www.sussex.ac.uk/informaticsfcogslib/reports/csrpfcsrp548.ps. [retrieved on May 30, 2016] section 3.1.
International Search Report and Written Opinion—PCT/US2016/022158—ISA/EPO—dated Jun. 14, 2016.

(Continued)

*Primary Examiner* — David R Vincent
(74) *Attorney, Agent, or Firm* — Seyfarth Shaw LLP

(57) ABSTRACT

A method of biasing a deep neural network includes determining whether an element has an increased probability of being present in an input to the network. The method also includes adjusting a bias of activation functions of neurons in the network to increase sensitivity to the element. In one configuration, the bias is adjusted without adjusting weights of the network. The method further includes adjusting an output of the network based on the biasing.

20 Claims, 13 Drawing Sheets

(56) References Cited

OTHER PUBLICATIONS

Papandreou G., et al., "Weakly- and Semi-Supervised Learning of a Deep Convolutional Network for Semantic Image Segmentation", arXiv:1502.02734v1, Feb. 9, 2015 (Feb. 9, 2015), XP055277514, Retrieved from the Internet URL:https://arxiv.org/abs/1502.02734v1 [retrieved on May 30, 2016].
Petrov A.A., et al., "Perceptual Learning without Feedback in Non-Stationary Contexts: Data and Model", Vision Research, vol. 46, No. 19, May 12, 2006 (May 12, 2006), pp. 3177-3197, XP025010150, DOI: 10.1016/j.visres.2006.03.022 section 3.
Ranzato M.A., et al., "Unsupervised learning of invariant feature hierarchies with applications to object recognition", Proceedings of the 2007 IEEE Conference on Computer Vision and Pattern Recognition (CVPR'07), Jun. 18, 2007 (Jun. 18, 2007), XP031114414, DOI : 10.1109/CVPR.2007.383157 figure 2.
Trentin E., "Networks with Trainable Amplitude of Activation Functions", Neural Networks, vol. 14, No. 4-5, May 14, 2001 (May 14, 2001), pp. 471-493, XP027378828, DOI: 10.1016/S0893-6080(01)000028-4 sections 2.3, 3.2 and 4.

\* cited by examiner

INCORPORATING TOP-DOWN INFORMATION IN DEEP NEURAL NETWORKS VIA THE BIAS TERM

CROSS-REFERENCE TO RELATED APPLICATION

The present application claims the benefit of U.S. Provisional Patent Application No. 62/154,097, filed on Apr. 28, 2015 and titled "INCORPORATING TOP-DOWN INFORMATION IN DEEP NEURAL NETWORKS VIA THE BIAS TERM," the disclosure of which is expressly incorporated by reference herein in its entirety.

BACKGROUND

Field

Certain aspects of the present disclosure generally relate to neural system engineering and, more particularly, to systems and methods for adjusting a bias term of activation functions of neurons in the network to increase sensitivity to an element based on whether the element has an increased probability of being present in an input to the network.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

In one aspect of the present disclosure, a method of biasing a deep neural network is disclosed. The method includes determining whether an element has an increased probability of being present in an input to the network. The method also includes adjusting a bias of activation functions of neurons in the network to increase sensitivity to the element. In one configuration, the bias is adjusted without adjusting weights of the network. The method further includes adjusting an output of the network based at least in part on the biasing.

Another aspect of the present disclosure is directed to an apparatus including means for determining whether an element has an increased probability of being present in an input to the network. The apparatus also includes means for adjusting a bias of activation functions of neurons in the network to increase sensitivity to the element. In one configuration, the bias is adjusted without adjusting weights of the network. The apparatus further includes means for adjusting an output of the network based at least in part on the biasing.

In another aspect of the present disclosure, a computer program product for biasing a deep neural network is disclosed. The computer program product has a non-transitory computer-readable medium with non-transitory program code recorded thereon. The program code is executed by a processor and includes program code to determine whether an element has an increased probability of being present in an input to the network. The program code also includes program code to adjust a bias of activation functions of neurons in the network to increase sensitivity to the element. In one configuration, the bias is adjusted without adjusting weights of the network. The program code further includes program code to adjust an output of the network based at least in part on the biasing.

Another aspect of the present disclosure is directed to an apparatus for biasing a deep neural network, the apparatus having a memory unit and one or more processors coupled to the memory. The processor(s) is configured to determine whether an element has an increased probability of being present in an input to the network. The processor(s) is also configured to adjust a bias of activation functions of neurons in the network to increase sensitivity to the element. In one configuration, the bias is adjusted without adjusting weights of the network. The processor(s) is further configured to adjust an output of the network based at least in part on the biasing.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
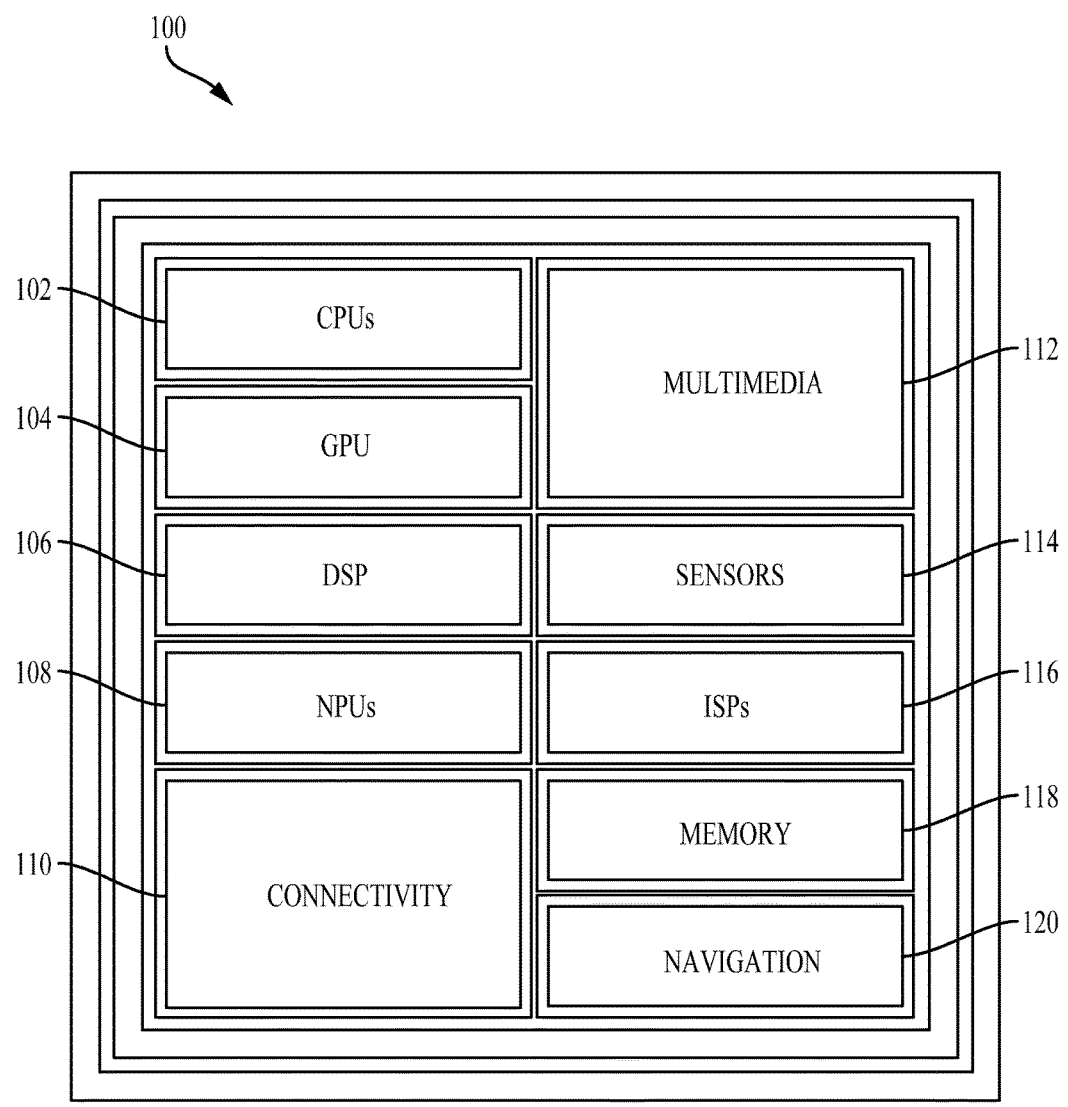
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In conventional systems, filters may be specified to modify or enhance an image. Additionally, a filter may be used to determine if a specific element is present in a portion of an image. For example, a filter may determine if a horizontal line is present in a 3×3 pixel portion of an image. Thus, by applying various types of filters, a system may determine whether specific objects are present in an image. Accordingly, the filtering may be used to facilitate classifying the image.

Convolution may be specified for linear filtering of an image. The convolution output is the weighted sum of input pixels. A matrix of weights may be referred to as the convolution kernel or filter. The convolution may be obtained by a matrix multiply of a linearized image and a linearized filter.

In conventional systems, an image may be classified based on the pixels of the image. Still, in some cases, there may be a priori knowledge that an object will be present in an image or has an increased probability of being present in the image. Aspects of the present disclosure are directed to biasing a network toward classifying an object based on a priori knowledge that the object will be present in an image or has an increased probability of being present in the image.

FIG. 1 illustrates an example implementation of the aforementioned network biasing using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108 or in a dedicated memory block 118. Instructions executed at the general-purpose processor 102 may be loaded from a program memory associated with the CPU 102 or may be loaded from a dedicated memory block 118.

The SOC 100 may also include additional processing blocks tailored to specific functions, such as a graphics processing unit (GPU) 104, a digital signal processor (DSP) 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. The SOC 100 may also include a sensor processor 114, image signal processors (ISPs), and/or navigation 120, which may include a global positioning system. The SOC may be based on an ARM instruction set.

The SOC 100 may include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code for determining whether an element has an increased probability of being present in an input to the network. The instructions loaded into the general-purpose processor 102 may also comprise code for adjusting a bias of activation functions of neurons in the network to increase sensitivity to the element. In one configuration, the bias is adjusted without adjusting weights of the network. The instructions loaded into the general-purpose processor 102 may further comprise code for adjusting an output of the network based on the biasing.

Figure 2:
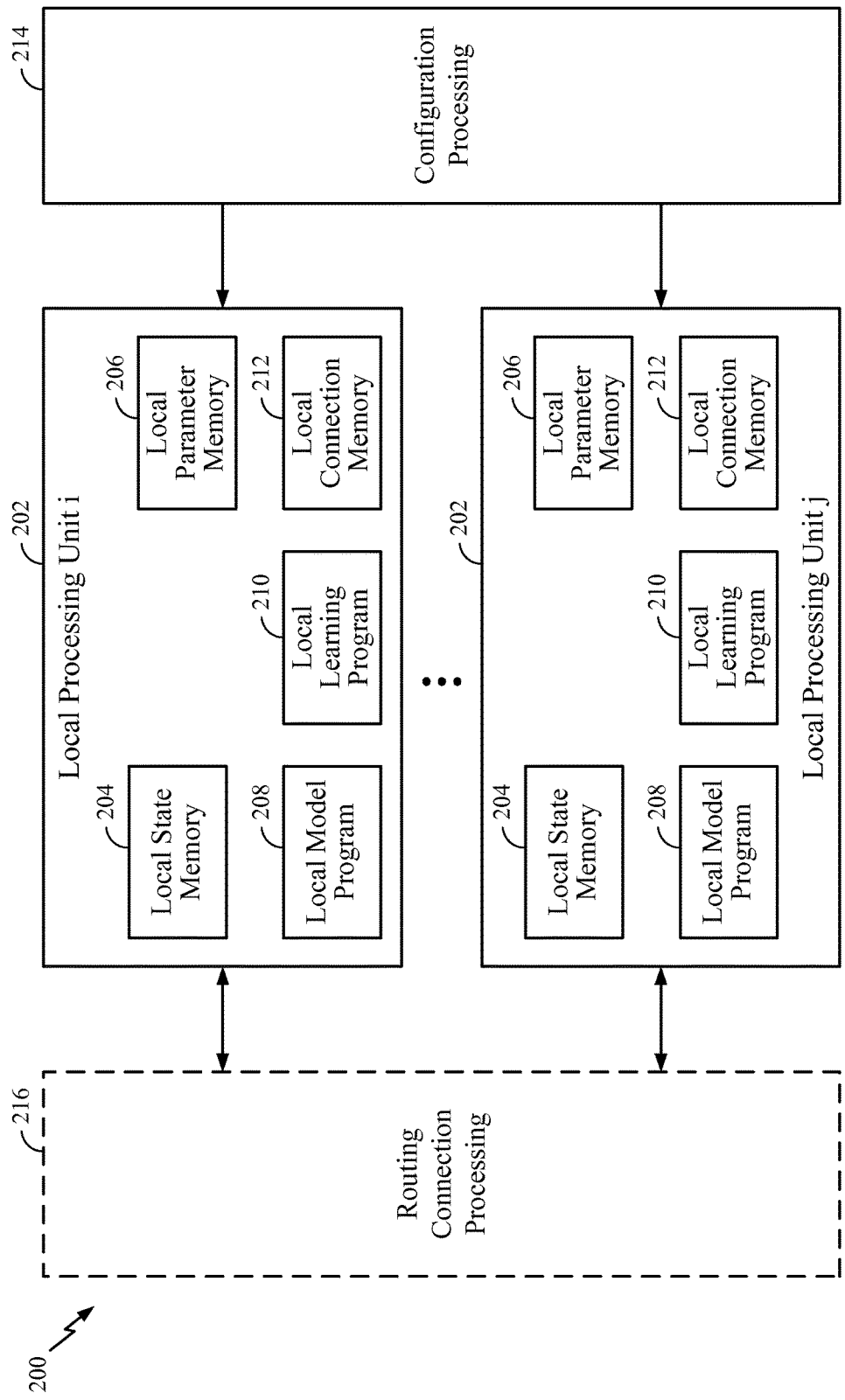
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
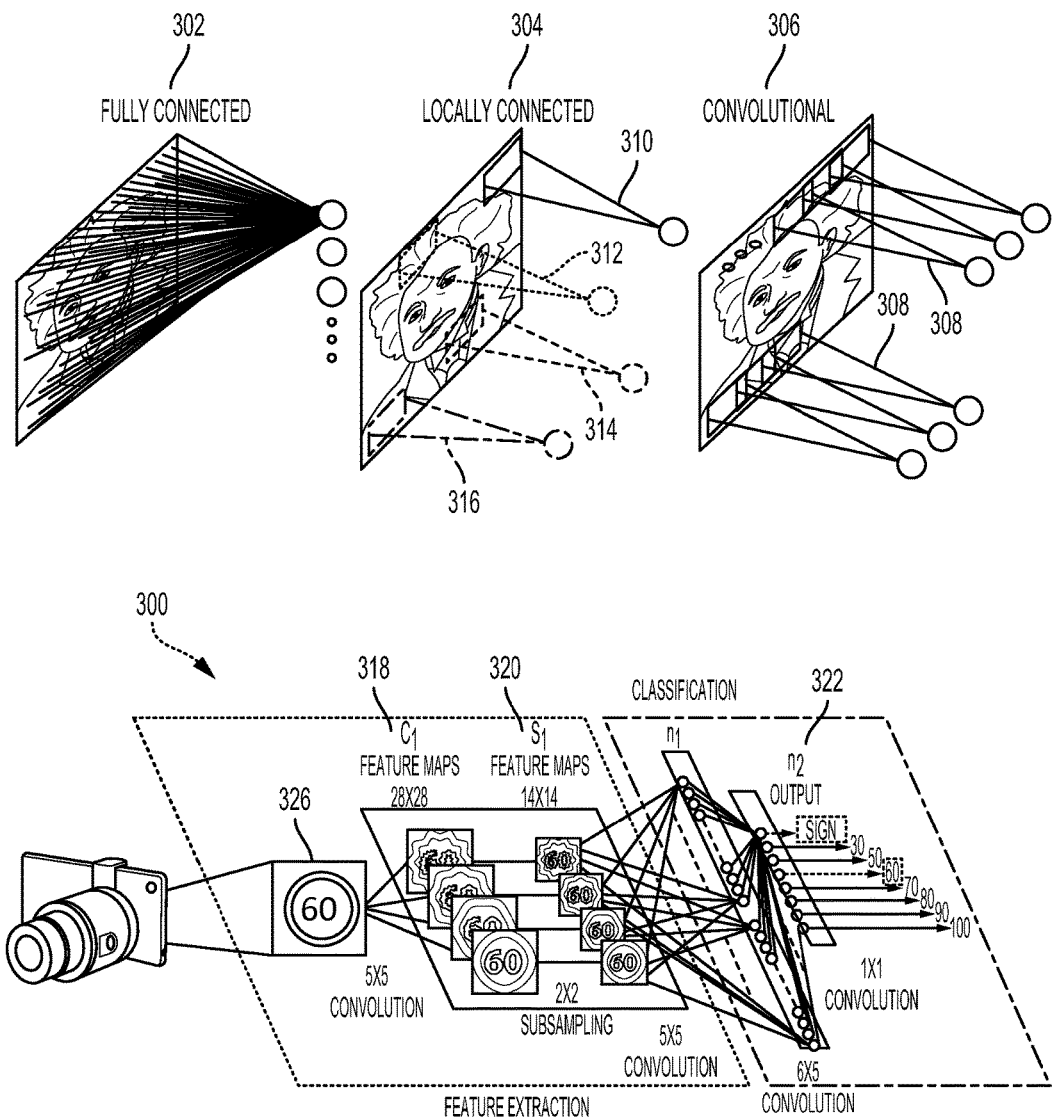
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image 326, such as a cropped image of a speed limit sign, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
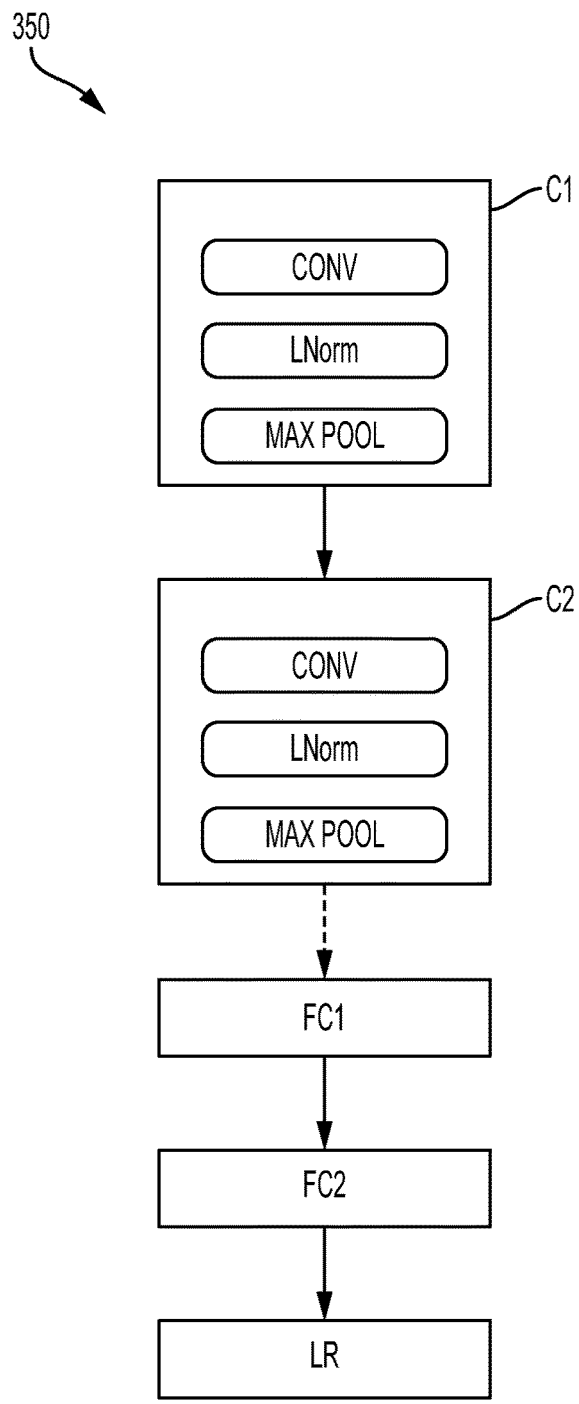
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown)

that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
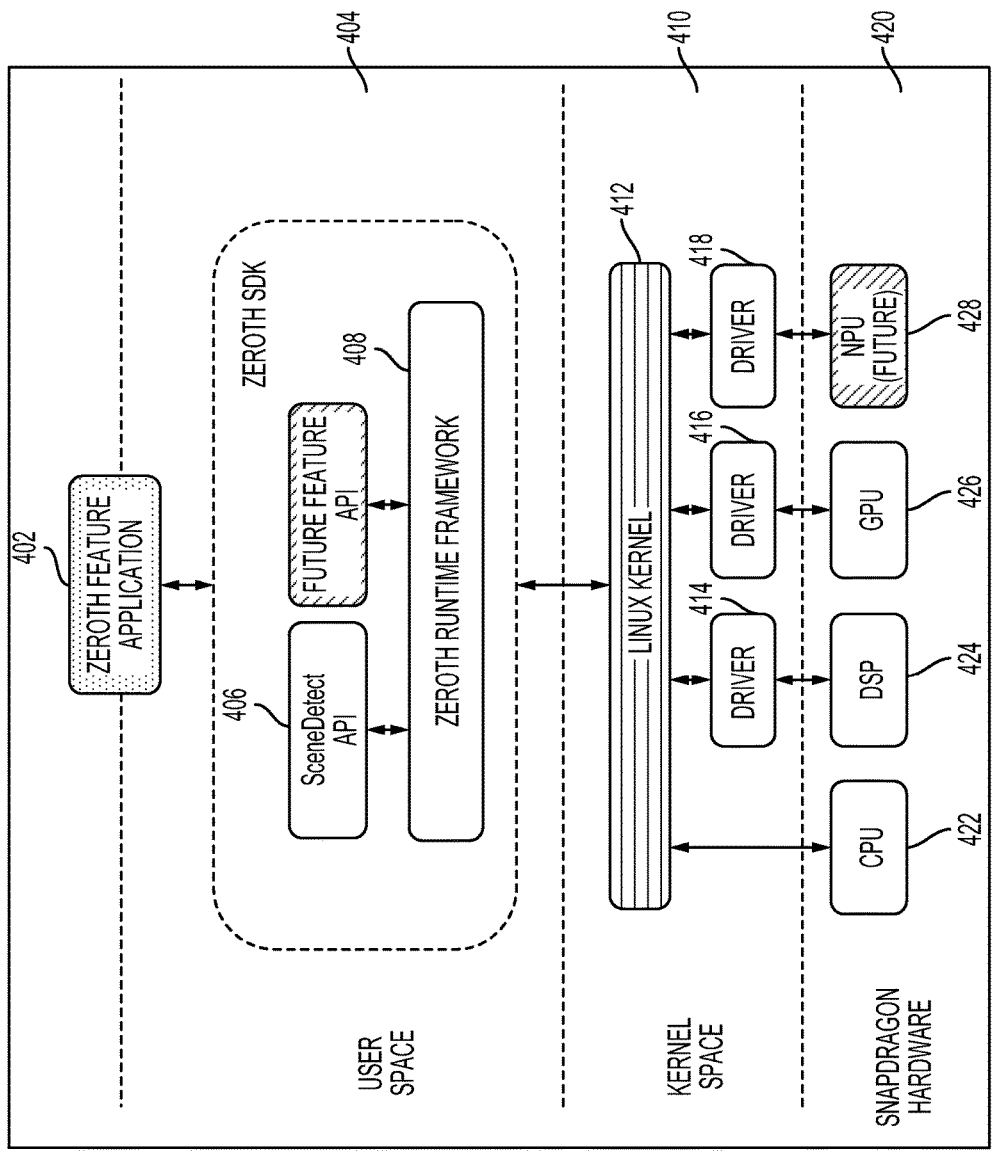
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
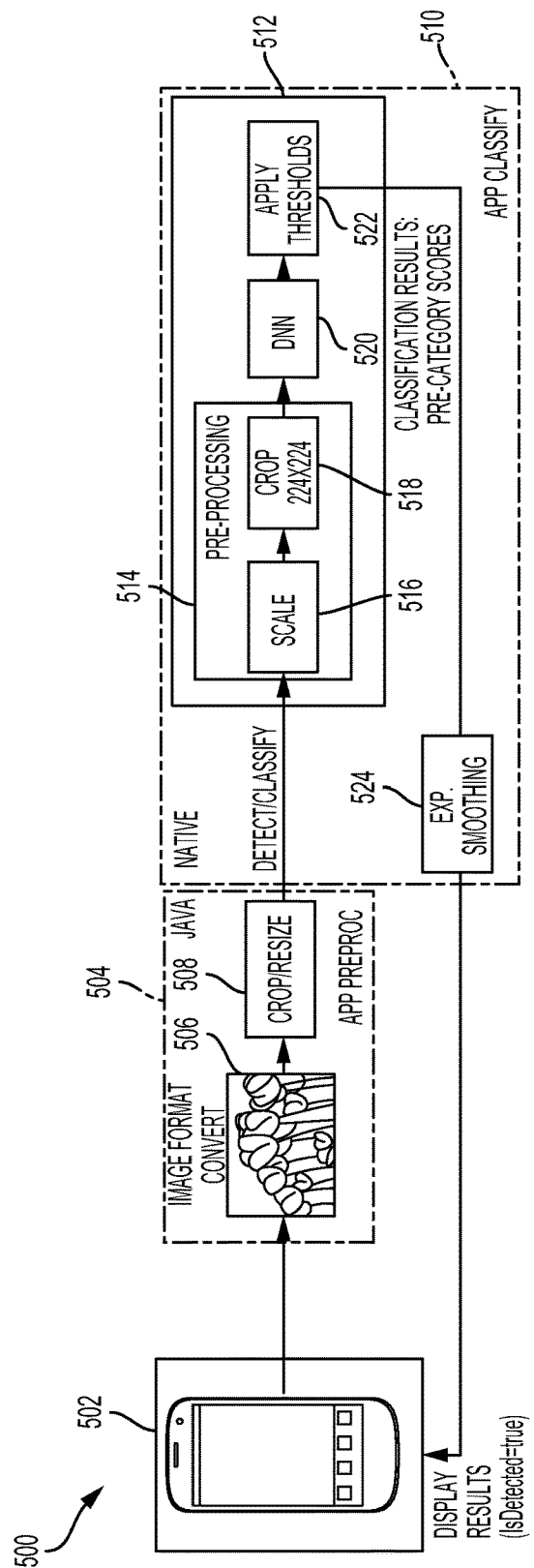
FIG. 5 is a block diagram illustrating the run-time operation of an AI application on a smartphone in accordance with aspects of the present disclosure.

FIG. 5 is a block diagram illustrating the run-time operation 500 of an AI application on a smartphone 502. The AI application may include a pre-process module 504 that may be configured (using for example, the JAVA programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further preprocess 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 100 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

In one configuration, a machine learning model, such as a neural network, is configured for determining whether an element has an increased probability of being present in an input to the network; adjusting a bias of activation functions of neurons in the network to increase sensitivity to the element; and adjusting an output of the network based at least in part on the biasing. The model includes a determining means and/or an adjusting means. In one aspect, the determining means and/or an adjusting means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

Incorporating Top-Down Information in Deep Neural Networks Via the Bias Term

As previously discussed, there may be a priori knowledge that an object will be present in an image or has an increased probability of being present in the image. For example, a time/location of an image may provide information regarding objects that may be present in the image. That is, in one example, if an image is taken at a football game, there is an increased probability that a football, grass, and/or helmets are present in the image. As another example, a probability of an object being present in the image may increase based on the presence of other objects in the image. For example, an image of a snowboarder has an increased probability of including snow.

Although aspects of the present disclosure are described for determining objects in images, aspects of the present disclosure are not limited to determining objects in images. Of course, aspects of the present disclosure are also contemplated for determining whether any element is present or has an increased probability of being present in an input to a network. For example, aspects of the present disclosure may be used to determine whether a specific sound is present in an audio input.

In one configuration, a network is biased toward classifying an object based on a priori knowledge that the object will be present in an image or has an increased probability of being present in the image. The bias may be specified to prevent false positives. That is, rather than increasing the output of a classifier neuron based on a probability that an object is present, aspects of the present disclosure scale a bias to amplify responses for objects detected in an image.

Figure 6:
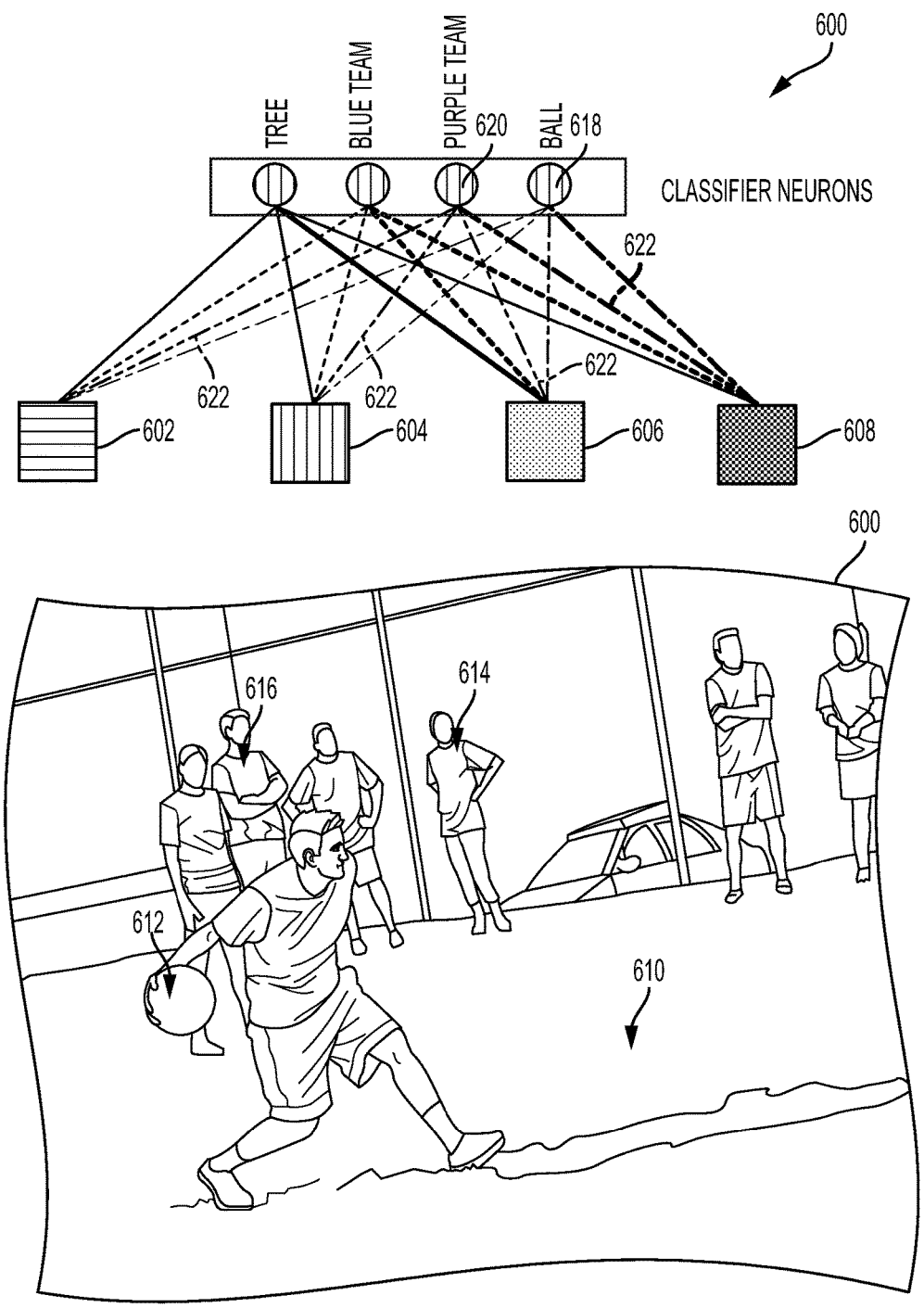
FIG. 6 is a diagram illustrating an image, filters, and neurons of a neural classifier network.

FIG. 6 illustrates an example of an image 600 and filters 602-608 that may be applied to the image 600. As shown in FIG. 6, the image 600 is an image of a kickball game. In this example, the image includes green grass 610, a red ball 612, players on a blue team 614, and a player on a purple team 616. The filters include a horizontal filter 602 that filters horizontal lines, a vertical filter 604 that filters vertical lines, a green filter 606 that filters green objects, and a red/purple filter 608 that filters red/purple objects. The filters of FIG. 6 are exemplary filters. Aspects of the present disclosure are not limited to the filters of FIG. 6 as aspects of the present disclosure are contemplated for a variety of filters to be applied to an input.

In the present example, after applying the filters 602-608 to the image 600, the output of the network may be:
1. 0.24—ball
2. 0.60—blue team
3. 0.15—purple team
4. 0.01—tree The output refers to the determined probability of an object being in the input based on evidence derived from the input. In this example, there is a twenty-four percent probability that a ball is in the image, a sixty percent probability that a player on the blue team is in the image, a fifteen percent probability that a player on the purple team is in the image, and a one percent probability that a tree is in the image.

As shown in FIG. 6, each filter 602-608 has an input to a classifier neuron associated with a specific object (e.g., class). In this example, for illustrative purposes, a thick line indicates a strong output from the filter and a thin line indicates a weak output from the filter. As the amount of evidence for the presence of an object increases, the strength of the output from the filter increases. For example, an output from the red/purple filter 608 to the red ball neuron 618 is strong based on the filter determining that there is evidence that a red object is present in the image.

However, as shown in FIG. 6, the output from the vertical filter 604 to the purple team neuron 620 is weak because the vertical filter 604 does not find any evidence of the purple team 616. As previously discussed, the vertical filter 604 determines whether vertical lines are present in the image. That is, the vertical filter 604 does not filter for features associated with the purple team 616, such as humans wearing purple shirts. Thus, because players on the purple team 616 are not associated with vertical lines, there is a weak connection between the vertical filter 604 to the purple team neuron 620.

According to aspects of the present disclosure, connections between network elements, such as filters and neurons may be referred to as synapses. Furthermore, the classifier neurons may be referred to as output neurons and/or object neurons. The classifier neurons, output neurons, and object neurons refer to neurons that output a value from an activation function based on an input from a filter.

As previously discussed, the image 600 includes a red ball 612 and an individual wearing a purple shirt (e.g., player on the purple team 616). Still, in the image 600, the red ball 612 is relatively small in comparison to other objects. Moreover, in the image 600, the individual wearing a purple shirt is not as numerous as other objects, such as the group of individuals wearing blue shirts. Accordingly, the red ball 612 and the individual wearing a purple shirt might be missed or assumed not to be present based on the network output.

Still, in the present configuration, the classification is specified to determine whether a player on the purple team 616 is in the image. In conventional systems, based on prior knowledge that the image 600 is an image of the blue team 614 playing kickball with the purple team 616, the response for the classifier neuron of the purple team (e.g., purple team neuron 620) may be increased based on the probability that the image 600 includes a player on the purple team 616. Still, there is a likelihood that a player on the purple team 616 is not present in an image. Therefore, increasing the response (e.g., activation value output) for the purple team neuron 620 based on the probability that the image 600 includes a player on the purple team 616 may lead to a false positive.

Thus, in addition to preventing false positives, it is desirable to mitigate incorrect or weak classifications of objects that are relatively small in comparison to other objects and/or not as numerous as other objects. According to aspects of the present disclosure, based on a priori knowledge that an object will be present in an image or an object has an increased probability of being present in the image, a bias of an activation function may be adjusted so that the output of the filters is adjusted based on the biasing. In one configuration, the bias of a synapse to a classifier neuron may be adjusted based on the probability that object is present in an image. As an example, the bias of synapses 622 to the purple team neuron 620 may be adjusted based on the probability that a player on the purple team 616 is present in the image.

In some cases, it may be undesirable to adjust the weights of the filter to alter the output of the network based on a priori knowledge that an object will be present in an image or an object has an increased probability of being present in the image. Specifically, the weights of the filters have been determined from numerous training passes. Therefore, adjusting the weights after training may alter the results of the training and lead to false values.

Additionally, directly changing the activation values may result in the network classifying objects that are not present (e.g., hallucinations). Therefore, in one configuration, the bias term is scaled to amplify responses that are likely to indicate the presence of an object. That is, in the present configuration, scaling the bias changes the operating range of the activation function to be more sensitive to the input. EQUATION 1 shows an equation for the activation function.

$$\text{activation} = f(\Sigma_i w_i x_i + \gamma b_i) \quad (1)$$

In EQUATION 1, $w_i$ is the weight, $x_i$ is the activation value output from a lower layer, such as a filter, and $\gamma b_i$ is the bias term. Specifically, $\gamma$ is the amount of adjustment for the bias and $b_i$ is the bias. According to EQUATION 1, the bias term may be scaled for all synapses that lead to a particular classifier neuron. That is, the gain of an input to a classifier neuron may be increased or decreased based on the bias.

Figure 7:
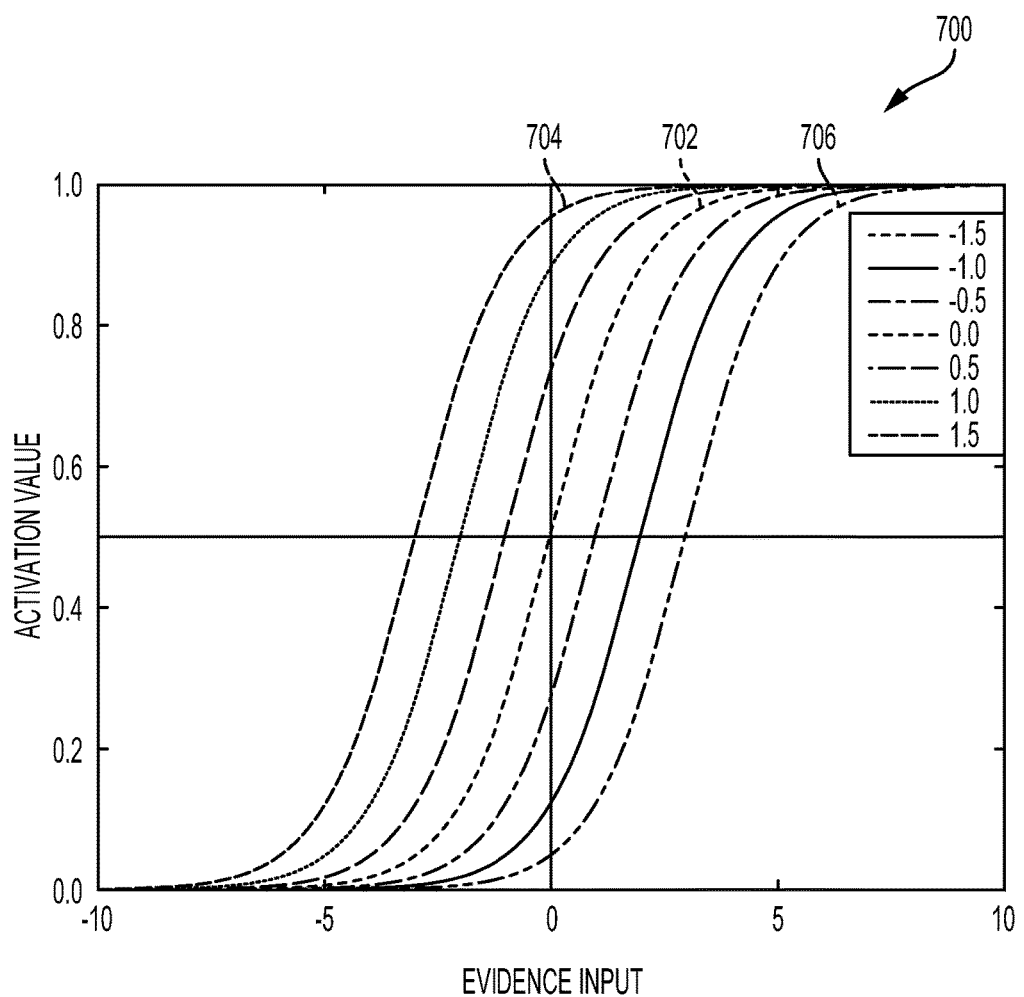
FIGS. 7 and 8 illustrate examples of graphs for evidence inputs and activation outputs of a neural classifier network according to aspects of the present disclosure.

FIG. 7 illustrates a coordinate graph 700 with the input ($\Sigma_i w_i x_i + \gamma b_i$) to a classifier neuron on the x-axis and a value of an activation function (EQUATION 1) that is output from the classifier neuron on the y-axis. The value of the activation function may be referred to as the activation value and the input to a classifier neuron may be referred to as the evidence input. The evidence input on the x-axis is a value for an amount of evidence for the presence of an object. In this example, the input values range from −10 to 10, such that a value of −10 indicates that there is little to no evidence that the object is present in the image and 10 indicates a large amount of evidence for the presence of the object. Furthermore, the activation value is the probability that an object is present in the image based on the amount of evidence (e.g., x-axis input) for the presence of the object in the image. Thus, as shown in FIG. 7, the activation value increases as the evidence input to the classifier neuron increases. That is, a strong evidence input to the classifier neuron results in a strong activation value output.

Additionally, FIG. 7 illustrates numerous lines plotted on the graph 700. The lines indicate results of adjusting the bias of an input. For example, a first line 702 indicates a baseline for an input and activation (e.g., no bias adjustment). In this example, as shown in the first line 702, an evidence input of 0 results in an activation value of approximately 0.5. Additionally, a second line 704 provides an example of adjusting the bias by 1.5. As shown on the second line 704, an evidence input of 0 results in an activation value of approximately 0.9.

Accordingly, as shown in FIG. 7, although the first line 702 and the second line 704 receive a same value for the evidence input, the activation value that is output from the classifier neuron is adjusted based on the scaled bias.

It should be noted that the bias may be positively adjusted or negatively adjusted. For example, FIG. 7 illustrates both positive and negative adjustments. The second line 704 plots the coordinates for adjusting the bias by 1.5. The third line 706 plots the coordinates for adjusting the bias by −1.5.

As previously discussed, the bias may be positively adjusted based on a priori knowledge of an item being present in an input. For example, because birds are associated with trees the bias may be positively adjusted for a tree when an image of a bird is presented. Furthermore, the bias may be negatively adjusted based on a priori knowledge of an item not being present in an input. For example, because baseballs are not associated with football games, the bias may be negatively adjusted for a baseball when an image of a football game is presented.

It should be noted that the bias is applied to each input of a classifier neuron. That is, the bias is applied to each piece of evidence, such as the output of each filter. For example, based on the example of FIG. 6, a bias may be applied to each of the synapses 622 that is input to the purple team neuron 620. As previously discussed, the value determined for the presence of an object may vary based on the type of filter.

For example, based on the example of FIG. 6, the horizontal filter 602 is specified to determine whether horizontal lines are present in the image. Accordingly, because a red ball has little to no vertical lines, the value of the evidence input to the red ball neuron 618 from the horizontal filter 602 is low. That is, the horizontal filter 602 found little to no evidence for horizontal lines that are associated with a red kick ball. Thus, because the bias is applied to an input from each filter, the probability that the object is present increases based on the amount of evidence found for the object from each filter.

As previously discussed, based on the example of FIG. 6, the output of the network with an unadjusted bias may be:
 1. 0.24—ball
 2. 0.60—blue team
 3. 0.15—purple team
 4. 0.01—tree In the present configuration, based on the example of FIG. 6, the bias is scaled to the ball based on a priori knowledge that the ball will be present in an image or has an increased probability of being present in the image. Based on a positive bias applied for the ball, the output of the network may be:
 1. 0.50—ball
 2. 0.35—blue team
 3. 0.05—purple team
 4. 0.00—tree As shown in the output provided above for a positive bias adjusted for the ball, in comparison to the unadjusted bias output, the probability of the ball is changed from twenty-four percent to fifty percent.

In the present configuration, based on the example of FIG. 6, the bias is scaled to the tree based on a priori knowledge that the tree has an increased probability of being present in the image. Based on this configuration, the output of the network may be:
 1. 0.10—ball
 2. 0.35—blue team
 3. 0.05—purple team
 4. 0.02—tree As shown in the output provided above for a positive bias adjusted for the tree, in comparison to the unadjusted bias output, the probability of the tree is changed from one percent to two percent. That is, because a tree is not present in the image 600 of FIG. 6, scaling a bias to a tree does not cause a significant increase in the probability of the tree being present.

Figure 8:
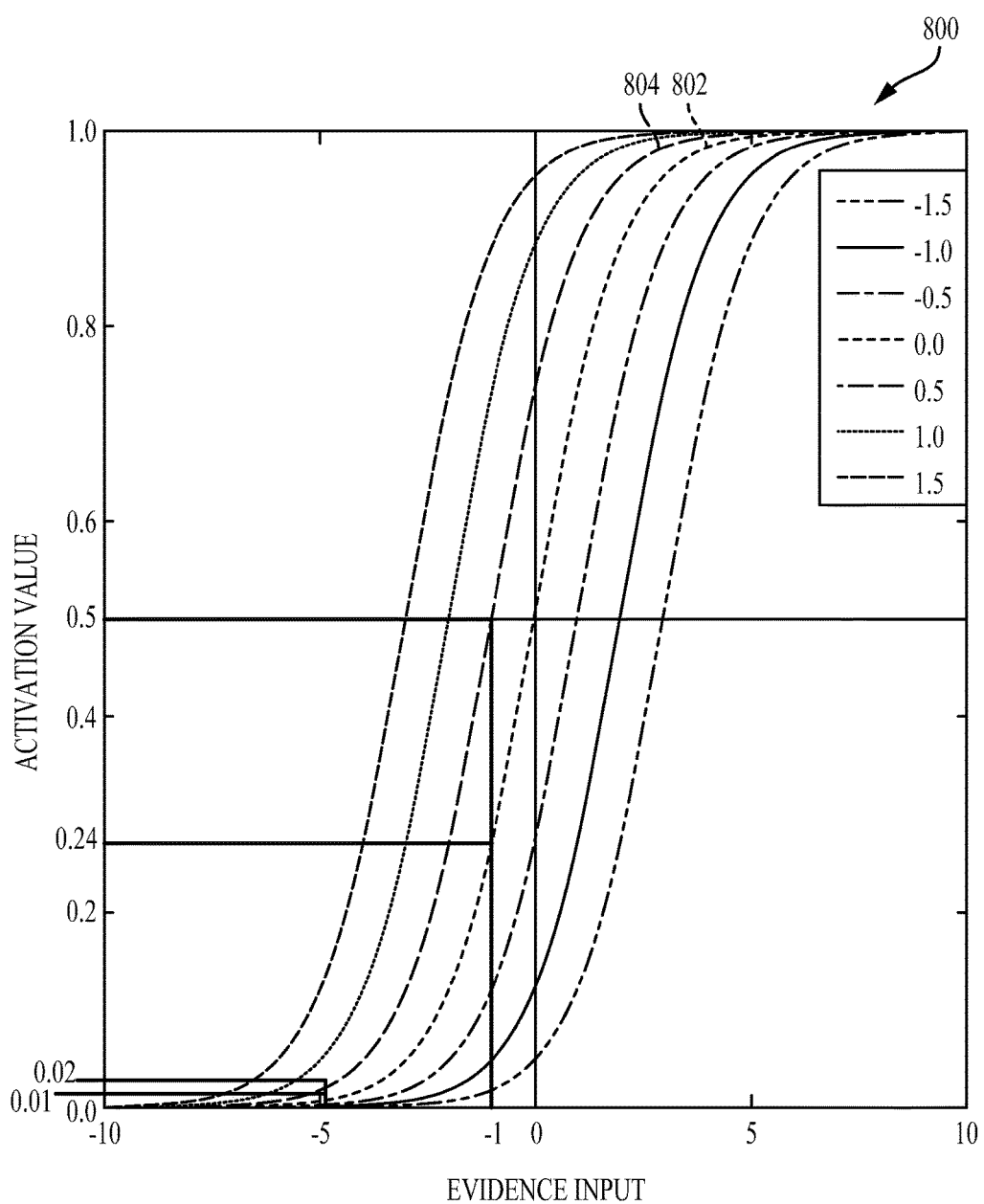

FIG. 8 illustrates a graph 800 having an x-axis representing an evidence value that is input to a classifier neuron from a filter and a y-axis representing a value of an activation function that is output from a classifier neuron. In FIG. 8, the different curved lines indicate results of adjusting the bias of an input. For example, a first line 802 indicates an unadjusted baseline for an input and activation. In this example, as shown in the first line 802, when a bias is not adjusted for the evidence input, an input of −1 results in an activation of approximately 0.24. Additionally, a second line 804 provides an example of adjusting the bias by 0.5 for the evidence input. As shown on the second line 804, an input of −1 results in an activation of approximately 0.5. Thus, as previously discussed, in the unadjusted network output, the value for an object, such as a ball, is 0.24. Furthermore, as described above, when a bias is adjusted for the object, the value is 0.5.

Additionally, as shown in FIG. 8, for a second object with a low evidence value, such as −5, the unadjusted activation value from the first line 802 is 0.01. Furthermore, a second line 804 provides an example of adjusting the bias by 0.5 for the evidence input of the second object. As shown on the second line 804, a value of −5 for evidence input results in an activation value of approximately 0.02. Thus, as described above, in the unadjusted network output, the activation value for the second object is 0.01. Furthermore, as described above, when a bias is adjusted for the second object, the activation value is 0.02. As previously discussed, because there is little to no evidence that the second object is present, adjusting the bias for the evidence input will not cause a significant change in the activation value.

In one configuration, the bias is adjusted as a function of the weights that lead to the object. For example, if a bias of ball is to be adjusted, an adjustment term that is proportional to the weight of the synapses is back propagated from the classifier neuron of the ball.

Figure 9:
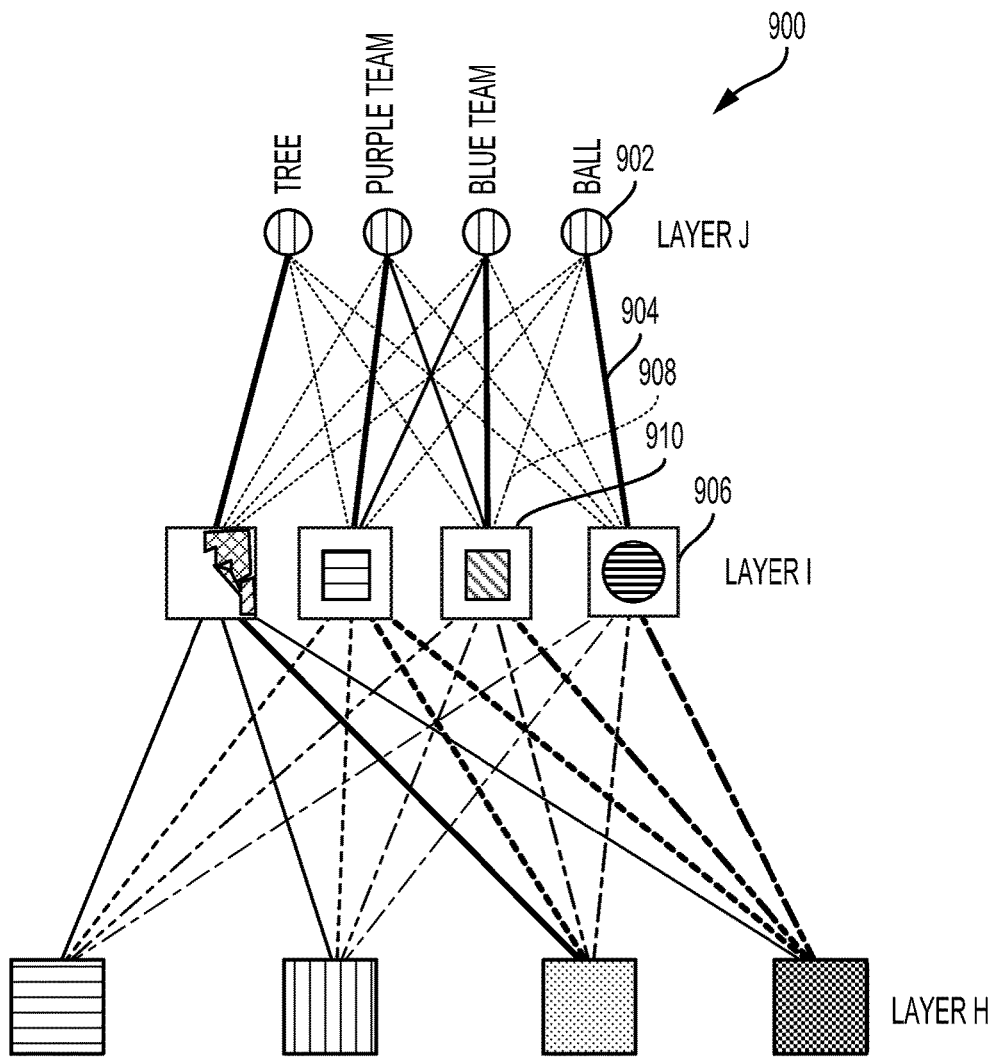
FIG. 9 is a diagram illustrating filters and neurons of a neural classifier network according to aspects of the present disclosure.

FIG. 9 illustrates an example 900 of a network with classifier neurons at a top layer (layer J) connected to object specific filters at a middle layer (Layer I). The classifiers are connected to the general filters at the lower layer (Layer H). In one example, the bias may be adjusted for the evidence of the ball. Thus, in this example, the adjustment value may be present at the top layer so that the adjustment value ($\gamma_{ij}$) is back propagated from the ball neuron 902 to the network in proportion to the weight of the synapses in the network. In this example, the adjustment value may be applied at the top layer when it is known that an object is present in the image or there is an increased probability that the object is present in the image.

For example, as shown in FIG. 9, the weight of the synapse 904 from the ball filter 906 to the ball neuron 902 is high. However, the weight of the other synapses 908 from the other object specific filters to the ball neuron 902 is weak. Therefore, the adjustment value back propagated to the ball filter 906 is stronger in comparison to the adjustment value that is back propagated from the ball neuron 902 to the other object specific filters of Layer I. That is, the adjustment value is back propagated in proportion to the weight of the synapse from each object specific filter at layer I to the classifier neuron at Layer J.

Additionally, the adjustment value is back propagated from the object specific filters at layer I to the general filters at layer H based on the weight of the synapses from the object specific filters to each general filter at layer H.

The equation for determining the adjustment value based on the weight of each synapse is as follows:

$$\gamma_{ij} = \gamma_0 w_{ij} \forall j \in \text{ball class} \tag{2}$$

$$\gamma_{hi} = \gamma_{ij} w_{hi} \tag{3}$$

In EQUATIONS 2 and 3, based on the example of FIG. 8, $w_{ij}$ is the weight of the synapse from Layer J to Layer I, $w_{hi}$ is the weight of the synapse form Layer H to Layer I, $\gamma_0$ is the amount of bias adjustment present at the output neuron, $\gamma_{ij}$ is the adjustment value applied to the synapse from Layer J to Layer I, and $\gamma_{hi}$ is the adjustment value applied to the synapse from Layer H to Layer I.

In another configuration, instead of adjusting the bias for a specific object (e.g., class), the bias may be adjusted to specific features, such as red objects, and/or objects with round edges. In this example, there may not be a priori knowledge of an object in an image. Still, in this example, the network may be searching for a specific object, such as a purple shirt. Therefore, the bias may be adjusted at any layer in the network. For example, based on FIG. 9, the bias may be adjusted for the purple image filter 910 at Layer I and the adjustment value may be back propagated to the filters at Layer H in proportion to the weight of each synapse from Layer H to Layer I. The equation for back propagating the adjustment value to each synapse connected to a filter at Layer I is as follows:

$$\gamma_{ij} = 0 \tag{4}$$

$$\gamma_{hi} = \gamma_0 w_{hi} \tag{5}$$

In EQUATIONS 4 and 5, based on the example of FIG. 9, $w_{hi}$ is the weight of the synapse from Layer H to Layer I, $\gamma_0$ is the amount of bias adjustment present at the output neuron, $\gamma_{ij}$ is the adjustment value applied to the synapse from Layer J to Layer I, and $\gamma_{hi}$ is the adjustment value applied to the synapse from Layer H to Layer I. In this configuration $\gamma_{ij}=0$ because the adjustment is back propagated from Layer I to Layer H instead of being applied and back propagated from Layer J.

In another configuration, the bias may be adjusted based on a measured response of the network to an exemplary image. For example, an image may be presented to the network and the response of the network is measured in response to the image. Furthermore, the bias may be adjusted based on the response. The adjusting may be performed at an internal level of the network.

Figure 10:
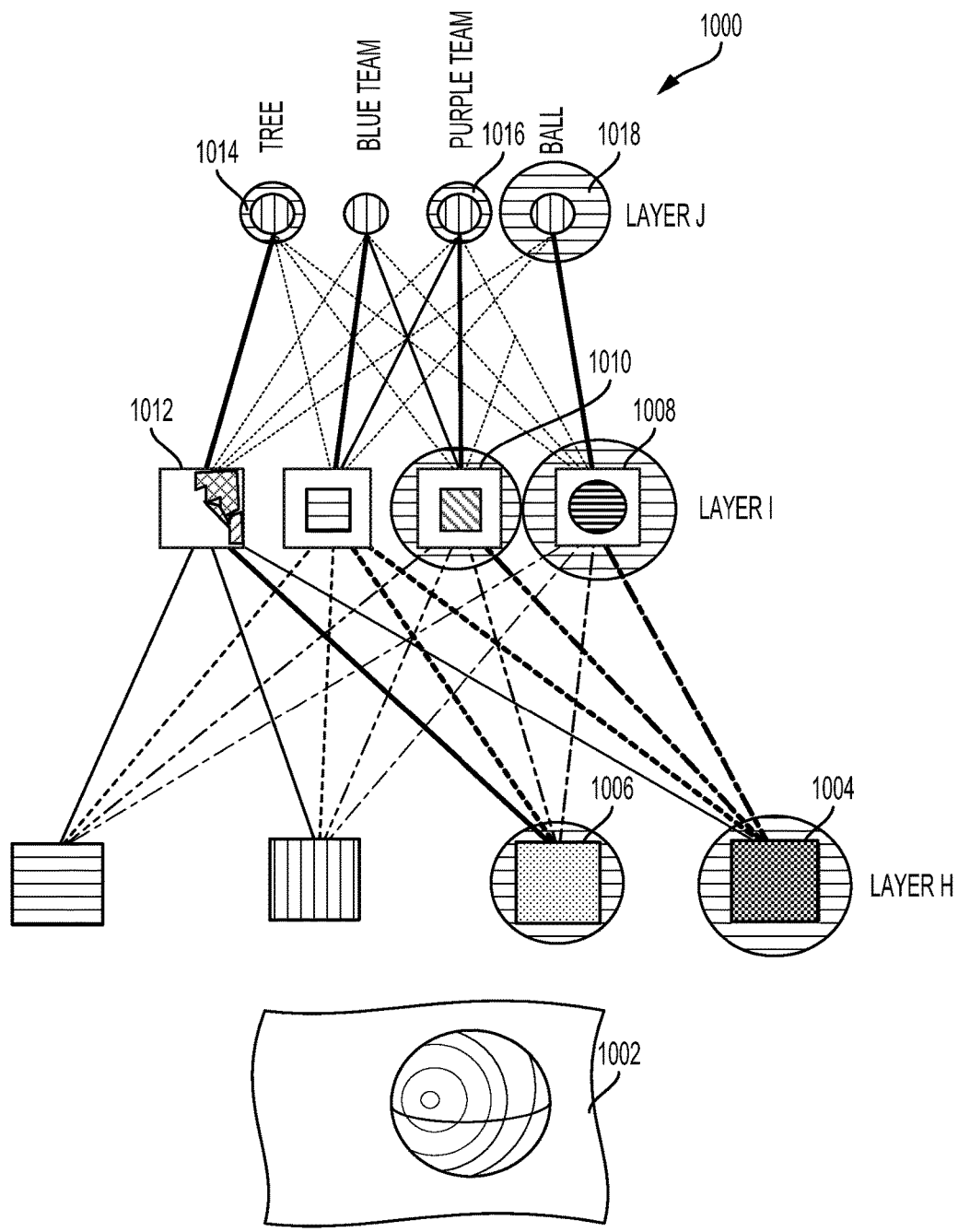
FIG. 10 is a diagram illustrating an image, filters, and neurons of a neural classifier network according to aspects of the present disclosure.

FIG. 10 illustrates an example of generating a bias based on a measured response to an image 1002 presented to the network 1000. As shown in FIG. 10, the network 1000 includes a top layer (Layer J) of classifier neurons, a middle layer (Layer I) of object specific filters, and a bottom layer (Layer H) of general filters. Furthermore, as shown in FIG. 10, an image 1002 is presented to the network 1000. In this example, the image 1002 is a purple ball with a background of leaves. As shown in FIG. 10, the purple ball of the image 1002 is not present as an object in the object neurons. Therefore, to determine the adjustment value for the objects in the image 1002, the image 1002 is presented to the network 1000 to measure the response of the network 1000.

In the present example, when the image 1002 is presented to the network 1000, the activations of the network are measured at the neurons, synapses, and layers. For example, as shown in FIG. 10, the activations are distributed at various filters, synapses, and neurons. Specifically, in this example, a purple filter 1004, a green filter 1006, a red ball filter 1008, a purple square filter 1010, and a tree filter 1012 are the filters that are activated in response to the image 1002. Furthermore, the activations are distributed at the classifier neurons, such that a tree neuron 1014, a purple team neuron 1016, and a ball neuron 1018 are activated. It should be noted that in FIG. 10, the synapses with thick lines represent the synapses that are activated in response to the image 1002. In the example of FIG. 10, the size of a circle relative to the filter/neuron is indicative of the level of activation, such that a bigger circle represents an activation that is greater than a smaller circle.

After determining the activations for the specific object, the bias may be adjusted as a function of the activations. For example, a new image can be presented to the network and the pattern of activations throughout the network is observed. The bias is then distributed to each synapse proportional to the activation of the neuron to which the synapse is connected. In this example, the bias is adjusted from the bottom-up, such that some of the bias is distributed among the synapses at each layer. In this configuration, the bias may be adjusted from the bottom-up based on the following equations:

$$\gamma_{ij} = \frac{\gamma_0}{N_{ij\ synapses}} x_i \tag{6}$$

$$\gamma_{hi} = \frac{\gamma_0}{N_{hi\ synapses}} x_h \tag{7}$$

In EQUATIONS 6 and 7, based on the example of FIG. 10, $\gamma_0$ is the amount of bias adjustment present at the output neuron, $\gamma_{ij}$ is the adjustment value applied to the synapse from Layer J to Layer I, and $\gamma_{hi}$ is the adjustment value applied to the synapse from Layer H to Layer I, $x_i$ is the value output from a specific synapse of Layer I, and $x_h$ is the value output from a specific synapse of Layer H.

In another configuration, the adjustment value is back propagated from the output based on the following equations:

$$\gamma_{ij} = (\gamma_0 w_{ij}) x_j \tag{8}$$

$$\gamma_{hi} = \gamma_{ij} w_{hi} \tag{9}$$

In EQUATIONS 8 and 9, based on the example of FIG. 10, $\gamma_0$ is the amount of bias adjustment present at the output neuron, $\gamma_{ij}$ is the adjustment value applied to the synapse from Layer J to Layer I, and $\gamma_{hi}$ is the adjustment value applied to the synapse from Layer H to Layer I, $x_j$ is the pattern of activations at Layer J, $w_{hi}$ is the weight of the synapse from Layer H to Layer I, and $w_{ij}$ is the weight of the synapse from Layer I to Layer J.

Based on aspects of the present disclosure, multiple configurations are presented for adjusting the bias. In one configuration, the bias may be adjusted as a constant. The bias may be adjusted as a constant when the top-down signal is determined from a knowledge-graph type source. For example, the bias may be adjusted as a constant when it is known that an image of a bird has an increased probability of including an image of a tree. EQUATION 1 may be used for adjusting the bias as a constant.

In another configuration, the bias is adjusted as a function of the synaptic weight. The bias may be adjusted as a function of the synaptic weight so that important weights for a given object are biased. Additionally, or alternatively, the bias may be adjusted as a function of the synaptic weight so that the adjustment value is back propagated through the network. The equation for adjusting the bias as a function of the synaptic weight is:

$$\text{activation}=f(\Sigma_i w_i x_i + \gamma(w_i) b_i) \quad (10)$$

In EQUATION 10, $w_i$ is the weight, ( ) is the bias adjustment (e.g., change in bias), $x_i$ is the value output from a lower layer, and $b_i$ is the bias.

In another configuration, the bias is adjusted as a function of the activations in response to a target class presentation. This configuration may be used when the top-down signal is derived from an example presented to the network. For example, as shown in FIG. 10, an image 1002 is presented to the network 1000 and the bias is determined based on the distribution of activations in the network. The equation for adjusting the bias as a function of the activations in response to a target class presentation may be based on the following equation:

$$\text{activation}=f(\Sigma_i w_i x_i + \gamma(x_i) b_i) \quad (11)$$

In EQUATION 11, $w_i$ is the weight, ( ) is the bias adjustment (e.g., change in bias), $x_i$ is the value output from a lower layer, and $b_i$ is the bias.

Furthermore, the bias adjustment may be applied additively or multiplicatively. The application of the bias may depend on the activation function.

The adjustment of the bias may be additively applied based on the following equation:

$$\text{activation}=f(\Sigma_i w_i x_i + (\gamma + b_i)) \quad (12)$$

In EQUATION 12, $w_i$ is the weight, $\gamma$ is the bias adjustment (e.g., change in bias), $x_i$ is the value output from a lower layer, and $b_i$ is the bias.

In one configuration, the adjustment of the bias is multiplicatively applied based on EQUATION 1. Multiplicatively applying the bias may be desirable because the bias is scaled from the original value.

Figure 11:
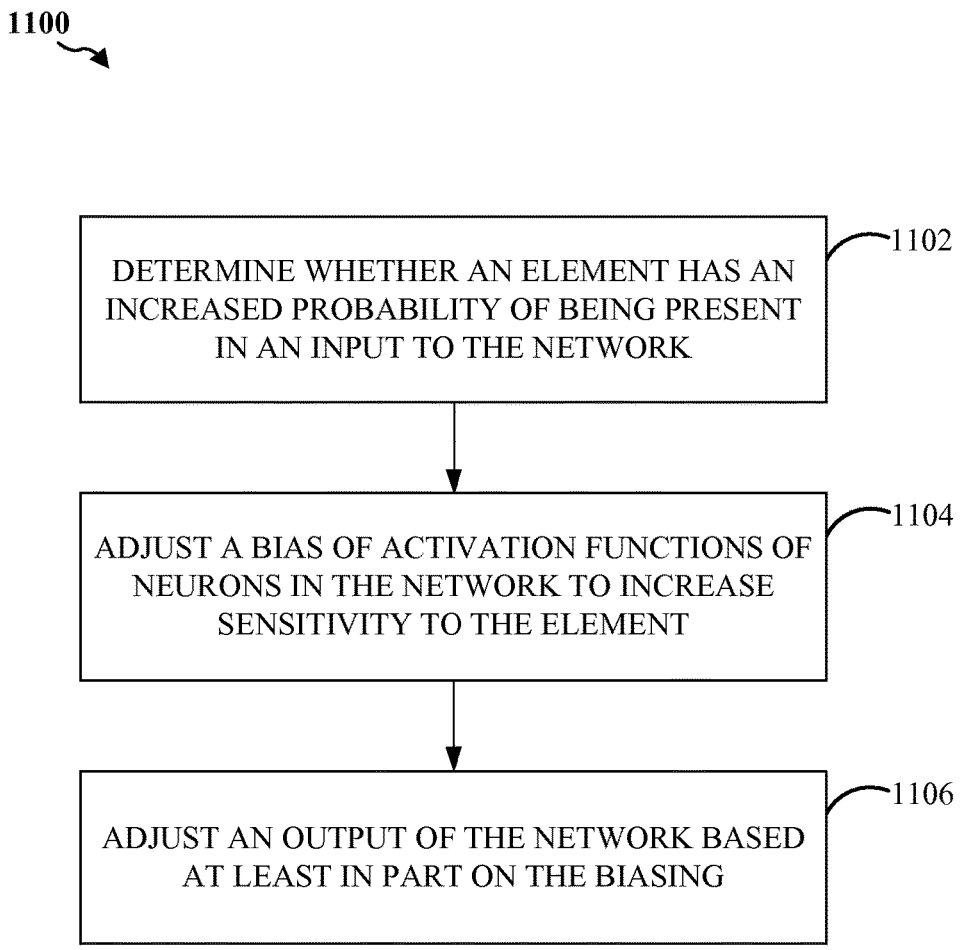
FIGS. 11 and 12 are flow diagrams for methods of adjusting a bias in a neural classifier network according to aspects of the present disclosure.

FIG. 11 illustrates a method 1100 of adjusting a bias for an activation function in a machine learning network, such as a neural classifier network. At block 1102, a network determines whether an element has an increased probability of being present in an input to the network. At block 1104, the network adjusts a bias term of activation functions of neurons in the network to increase sensitivity to the element. In one configuration, the bias is adjusted without adjusting weights of the network. Furthermore, at block 1106, the network adjusts an output of the network based on the biasing.

Figure 12:
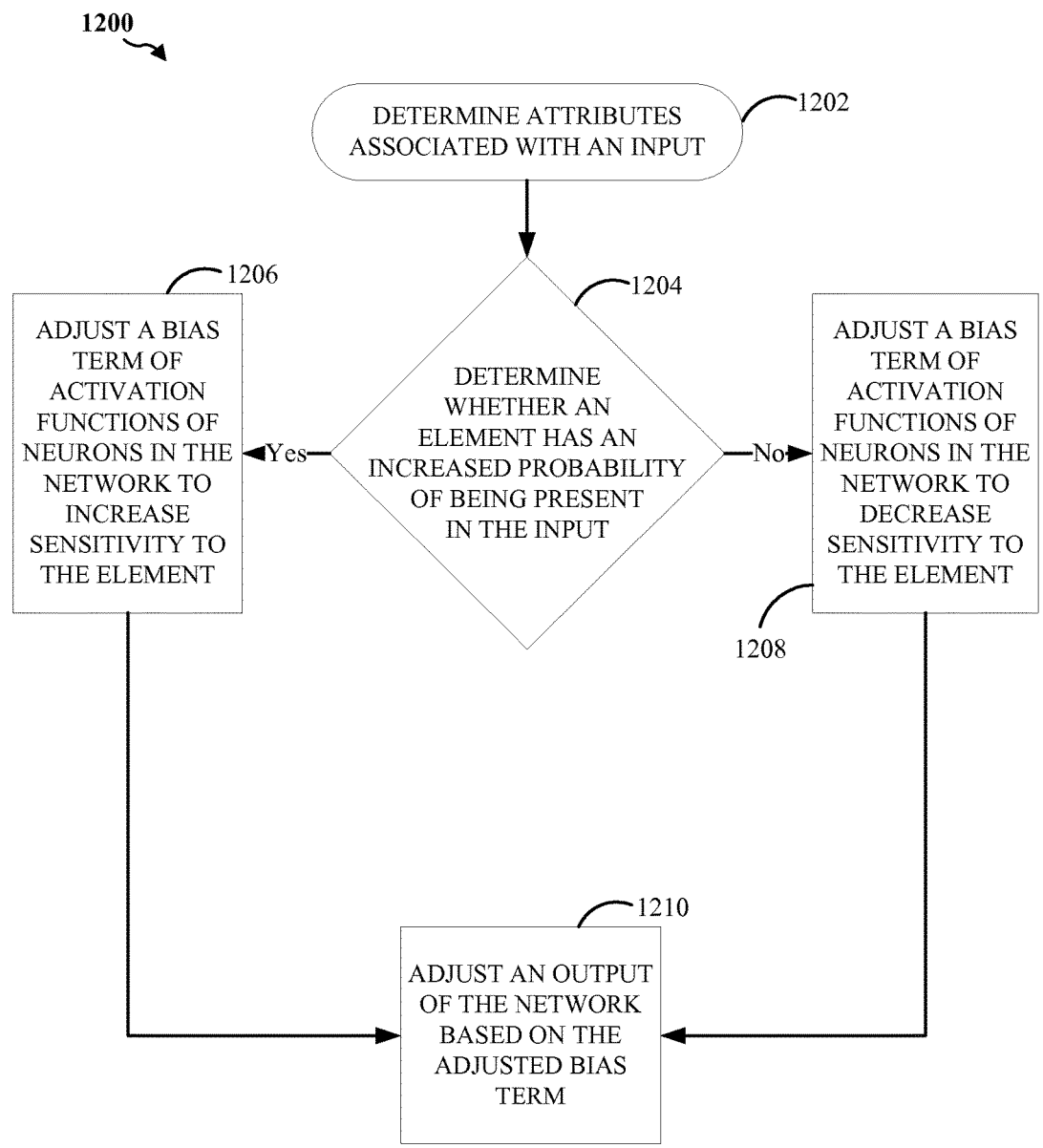

FIG. 12 illustrates a method 1200 of adjusting a bias for an activation function in a machine learning network, such as a neural classifier network. At block 1202, a network determines attributes associated with an input, such as an image. As an example, the attributes may include a time of an image, location of an image, and/or specific objects that are present in the image. Based on the determined attributes, at block 1204, the network determines whether an element has an increased probability of being present in the input.

If the element has an increased probability of being present in an input to the network, at block 1206, the network adjusts a bias term of activation functions of neurons in the network to increase sensitivity to the element. Furthermore, at block 1210, the network adjusts the network output based on the adjusted bias term.

If the element does not have an increased probability of being present in an input to the network, at block 1208, the network adjusts a bias term of activation functions of neurons in the network to decrease sensitivity to the element. Furthermore, at block 1210, the network adjusts the network output based on the adjusted bias term.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A computer-implemented method for classifying an element in an input by biasing a deep neural network, comprising:
   determining, prior to classifying the element in the input to the deep neural network, whether the element has an increased probability of being present in the input to the deep neural network based on at least one of a location of the input, a time of the input, or another element classified in the input;
   adjusting a bias of activation functions of neurons in the deep neural network to increase sensitivity to the element based on whether the element has an increased probability of being present in the input, the bias being adjusted without adjusting weights of the deep neural network;
   adjusting an output of the deep neural network based at least in part on the adjusted bias; and
   classifying the element based on the output of the deep neural network.

2. The computer-implemented method of claim 1, further comprising determining an amount of adjustment for the bias as a constant, function of a synaptic weight, or function of activations in response to presentation of a target class.

3. The computer-implemented method of claim 1, in which adjusting the bias comprises scaling the bias.

4. The computer-implemented method of claim 3, in which a scale of the adjusting is based at least in part on a priori knowledge of what is likely to be present in the input and/or what is not likely to be present in the input.

5. The computer-implemented method of claim 1, in which the adjusting is performed at an internal level of the deep neural network.

6. An apparatus for classifying an element in an input by biasing a deep neural network, comprising:
   means for determining, prior to classifying the element in the input to the deep neural network, whether the element has an increased probability of being present in the input to the deep neural network based on at least one of a location of the input, a time of the input, or another element classified in the input;
   means for adjusting a bias of activation functions of neurons in the deep neural network to increase sensitivity to the element based on whether the element has an increased probability of being present in the input, the bias being adjusted without adjusting weights of the deep neural network;
   means for adjusting an output of the deep neural network classifying the element based at least in part on the adjusted bias; and
   means for classifying the element based on the output of the deep neural network.

7. The apparatus of claim 6, further comprising means for determining an amount of adjustment for the bias as a constant, function of a synaptic weight, or function of activations in response to presentation of a target class.

8. The apparatus of claim 6, in which the means for adjusting the bias comprises means for scaling the bias.

9. The apparatus of claim 8, in which a scale of the adjusting is based at least in part on a priori knowledge of what is likely to be present in the input and/or what is not likely to be present in the input.

10. The apparatus of claim 6, in which the means for adjusting is performed at an internal level of the deep neural network.

11. An apparatus for classifying an element in an input by biasing a deep neural network, comprising:
    a memory unit; and
    at least one processor coupled to the memory unit, the at least one processor configured:
       to determine, prior to classifying the element in the input to the deep neural network, whether the element has an increased probability of being present in the input to the deep neural network based on at least one of a location of the input, a time of the input, or another element classified in the input;
       to adjust a bias of activation functions of neurons in the deep neural network to increase sensitivity to the element based on whether the element has an increased probability of being present in the input, the bias being adjusted without adjusting weights of the deep neural network;
       to adjust an output of the deep neural network based at least in part on the adjusted bias; and
       to classify the element based on the output of the deep neural network.

12. The apparatus of claim 11, in which the at least one processor is further configured to determine an amount of adjustment for the bias as a constant, function of a synaptic weight, or function of activations in response to presentation of a target class.

13. The apparatus of claim 11, in which the at least one processor is further configured to adjust the bias by scaling the bias.

14. The apparatus of claim 13, in which a scale of the adjusting is based at least in part on a priori knowledge of what is likely to be present in the input and/or what is not likely to be present in the input.

15. The apparatus of claim 11, in which the at least one processor is further configured to adjust the bias at an internal level of the deep neural network.

16. A non-transitory computer-readable medium having program code recorded thereon for classifying an element in an input by a deep neural network, the program code being executed by a processor and comprising:

program code to determine, prior to classifying the element in the input to the deep neural network, whether the element has an increased probability of being present in the input to the deep neural network based on at least one of a location of the input, a time of the input, or another element classified in the input;

program code to adjust a bias of activation functions of neurons in the deep neural network to increase sensitivity to the element based on whether the element has an increased probability of being present in the input, the bias being adjusted without adjusting weights of the deep neural network;

program code to adjust an output of the deep neural network based at least in part on the adjusted bias; and program code to classify the element based on the output of the deep neural network.

17. The computer-readable medium of claim 16, in which the program code further comprises program code to determine an amount of adjustment for the bias as a constant, function of a synaptic weight, or function of activations in response to presentation of a target class.

18. The computer-readable medium of claim 16, in which the program code to adjust the bias comprises program code to adjust the bias by scaling the bias.

19. The computer-readable medium of claim 18, in which a scale of the adjusting is based at least in part on a priori knowledge of what is likely to be present in the input and/or what is not likely to be present in the input.

20. The computer-readable medium of claim 16, in which the program code to adjust the bias comprises program code to adjust the bias at an internal level of the deep neural network.

* * * * *